(12) United States Patent
Zhong

(10) Patent No.: US 8,736,791 B2
(45) Date of Patent: May 27, 2014

(54) LIQUID CRYSTAL DISPLAY DEVICE

(75) Inventor: Xinhui Zhong, Guangdong (CN)

(73) Assignee: Shenzhen China Star Optoelectronics Technology Co., Ltd., Shenzhen, Guangdong Province (CN)

(*) Notice: Subject to any disclaimer, the term of this patent is extended or adjusted under 35 U.S.C. 154(b) by 29 days.

(21) Appl. No.: 13/520,163

(22) PCT Filed: May 17, 2012

(86) PCT No.: PCT/CN2012/075624
§ 371 (c)(1),
(2), (4) Date: Jun. 29, 2012

(87) PCT Pub. No.: WO2013/170462
PCT Pub. Date: Nov. 21, 2013

(65) Prior Publication Data
US 2013/0300988 A1    Nov. 14, 2013

(30) Foreign Application Priority Data
May 14, 2012  (CN) .......................... 2012 1 0147389

(51) Int. Cl.
*G02F 1/1335* (2006.01)
(52) U.S. Cl.
USPC ........................................................ 349/106

(58) Field of Classification Search
USPC ........................................................ 349/106
See application file for complete search history.

(56) References Cited

U.S. PATENT DOCUMENTS 7,486,355 B2 * 2/2009 Rho ............................. 349/106
7,859,736 B2 * 12/2010 Shinohara ..................... 359/245

FOREIGN PATENT DOCUMENTS

| CN | 1847943 A | | 10/2006 |
|---|---|---|---|
| JP | 05066305 A | * | 3/1993 |

* cited by examiner

*Primary Examiner* — James Dudek
(74) *Attorney, Agent, or Firm* — Cheng-Ju Chiang

(57) ABSTRACT

The present invention provides a liquid crystal display device, which includes a TFT substrate, a CF substrate that is arranged parallel to the TFT substrate, liquid crystal interposed between the TFT substrate and the CF substrate, spacers arranged between the TFT substrate and the CF substrate, and an enclosing resin frame arranged between the TFT substrate and the CF substrate and located along edges of the TFT substrate and the CF substrate. The CF substrate includes a first glass substrate and a flexible color filter film arranged on the first glass substrate. The flexible color filter film is of a form of thin film bonded to the first glass substrate. The liquid crystal display device uses a flexible color filter film to replace a conventionally used color filter plate so as to simplify the manufacture.

9 Claims, 5 Drawing Sheets

LIQUID CRYSTAL DISPLAY DEVICE

BACKGROUND OF THE INVENTION

1. Field of the Invention

The present invention relates to the field of liquid crystal displaying, and in particular to a liquid crystal display device.

2. The Related Arts

The fast development of color displaying makes colorization an irreversible trend of liquid crystal display (LCD). A color filter is a key component for colorization of LCD and the performances (generally including aperture rate, color purity, and chromatic aberration) directly affects color reducibility, brightness, and contrast. However, the cost of the color filter takes 25% of the overall cost of a liquid crystal panel.

In a manufacture process of liquid crystal display device, a color filter is formed on a first glass substrate through the processes of resist exposure and development and is generally composed of a back matrix (BM), an overcoat (OC), conductive ITO (Indium Tin Oxide, which is a transparent conductive metal), and spacers (SP).

Conventional processes that are used to manufacture color filter include dyeing method, pigment dispersed method, electro-deposition method, and printing method. The dyeing method generally comprises the steps of coating, exposure and development, dyeing fixation. This process is performed three times on the first glass substrate on which the block matrix has been patternized to form three color resists of red (R), green (G), and blue (B). The electro-deposition method generally comprises the steps of first forming patternized ITO through exposure and development and then depositing the three color resists of R, G, and B on the ITO, followed by coating, exposure, and development to form the black matrix. The pigment dispersed method generally comprises the steps of coating, exposure, and development and making the three color resists of R, G, and B needs performances of this process by three times.

Apparently, the known processes of making color filter comprise a number of steps and each process requires coating of photo resist, exposure, and development. These processes are complicated, high cost, and low yield rate.

SUMMARY OF THE INVENTION

An object of the present invention is to provide a liquid crystal display device, which comprises a flexible color film to replace the conventionally used color filter in order to simplify the manufacture process of color filter, reduce cost, and improve yield rate.

Another object of the present invention is to provide a liquid crystal display device, which comprises a composite film of a flexible color film and a polarization film to further simplify the manufacture process and also simplify assembling operation.

To achieve the objects, the present invention provides a liquid crystal display device, which comprises: a TFT substrate, a CF substrate that is arranged parallel to the TFT substrate, liquid crystal interposed between the TFT substrate and the CF substrate, spacers arranged between the TFT substrate and the CF substrate, and an enclosing resin frame arranged between the TFT substrate and the CF substrate and located along edges of the TFT substrate and the CF substrate. The CF substrate comprises a first glass substrate and a flexible color filter film arranged on the first glass substrate. The first glass substrate comprises a bottom surface that is close to the TFT substrate and a top surface that is away from the TFT substrate. The flexible color filter film is of a form of thin film bonded to the first glass substrate.

The flexible color filter film is formed through a process of stamping, printing, coating development, or polymerization deposition and is attached to the first glass substrate by adhesives.

The flexible color filter film is arranged on the top surface of the first glass substrate.

The CF substrate further comprises a first polarization plate, which is arranged above the top surface of the first glass substrate of the CF substrate. The flexible color filter film is arranged above the first polarization plate or between the first polarization plate and the first glass substrate.

The CF substrate comprises a first polarization plate located on the top surface of the first glass substrate of the CF substrate and a compensation film that is away from the first glass substrate and located on the first polarization plate. The flexible color filter film is arranged between the compensation film and the first polarization plate.

The flexible color filter film is arranged on the bottom surface of the first glass substrate.

The present invention also provides a liquid crystal display device, which comprises: a TFT substrate, a CF substrate that is arranged parallel to the TFT substrate, liquid crystal interposed between the TFT substrate and the CF substrate, spacers arranged between the TFT substrate and the CF substrate, and an enclosing resin frame arranged between the TFT substrate and the CF substrate and located along edges of the TFT substrate and the CF substrate. The CF substrate comprises a first glass substrate and a composite film arranged on the first glass substrate. The composite film comprises a flexible color filter film and a polarization film arranged on the flexible color filter film.

The first glass substrate comprises a bottom surface that is close to the TFT substrate and a top surface that is away from the TFT substrate. The flexible color filter film is formed through a process of stamping, printing, coating development, or polymerization deposition and is attached to the top surface of the first glass substrate by adhesives.

The I composite film further comprises a compensation film, which is distant from the first glass substrate and located on the polarization film.

The flexible color filter film is arranged below the polarization film or between the polarization film and the compensation film.

The efficacy of the present invention is that the present invention provides a liquid crystal display device, which comprises a flexible color filter film to replace a conventionally used color filter plate and being formed through stamping, printing, coating development, or polymerization deposition so as to simplify the manufacture of the color filter plate and improve manufacture yield to thereby reduce the manufacture cost. Further, the flexible color filter film can be attached to a first glass substrate by adhesives to form a CF substrate, thereby improving the yield rate of assembling and further reducing manufacture cost. Further, the flexible color filter film can be manufactured together with a polarization film and a compensation film to form a composite film having a multiple-layered structure for subsequent application to a liquid crystal display device for simplifying the manufacture process and also simplifying assembling operation.

For better understanding of the features and technical contents of the present invention, reference will be made to the following detailed description of the present invention and the attached drawings. However, the drawings are provided for the purposes of reference and illustration and are not intended to impose undue limitations to the present invention.

BRIEF DESCRIPTION OF THE DRAWINGS

The technical solution, as well as beneficial advantages, will be apparent from the following detailed description of an embodiment of the present invention, with reference to the attached drawings. In the drawings.

DETAILED DESCRIPTION OF THE PREFERRED EMBODIMENTS

To further expound the technical solution adopted in the present invention and the advantages thereof, a detailed description is given to a preferred embodiment of the present invention and the attached drawings.

Figure 1:
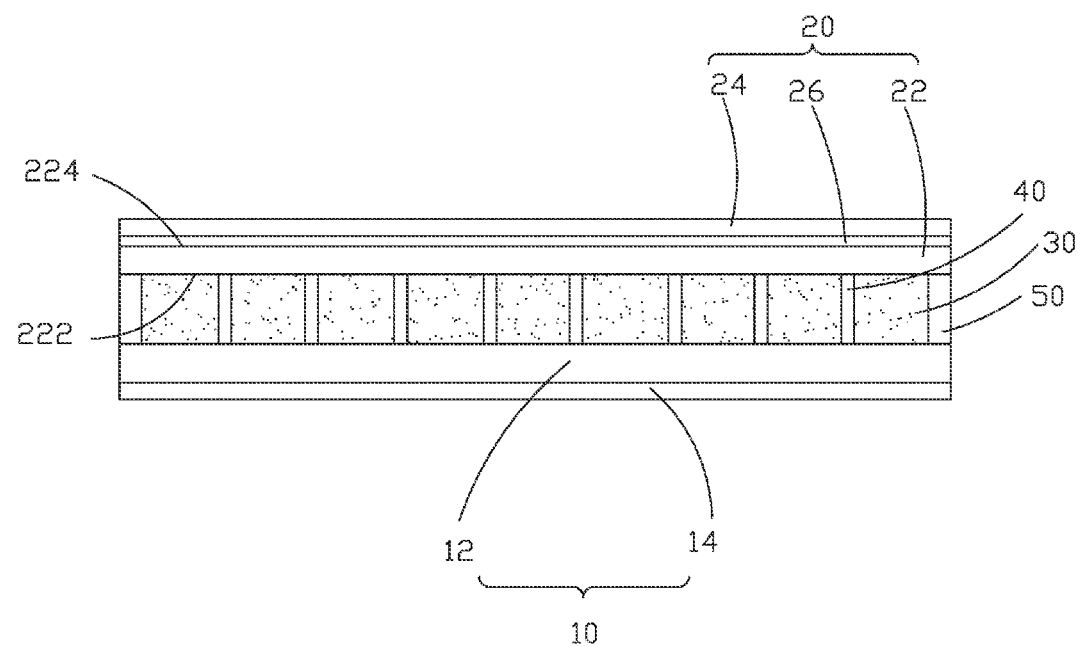
FIG. 1 is a schematic view showing the structure of a liquid crystal display device according to a first embodiment of the present invention.

Referring to FIG. 1, the present invention provides a liquid crystal display device, which comprises: a TFT substrate 10, a CF substrate 20 that is arranged parallel to the TFT substrate 10, liquid crystal 30 interposed between the TFT substrate 10 and the CF substrate 20, spacers 40 arranged between the TFT substrate 10 and the CF substrate 20, and an enclosing resin frame 50 arranged between the TFT substrate 10 and the CF substrate 20 and located along edges of the TFT substrate 10 and the CF substrate 20.

The CF substrate 20 comprises a first glass substrate 22, a first polarization plate 24 located above the first glass substrate 22 and bonded to the first glass substrate 22, and a flexible color filter film 26 disposed on the first glass substrate 22 and is formed through stamping, printing, coating development, or polymerization deposition and can be attached to the first glass substrate 22 by adhesives so as to simplify the color filter plate manufacture process of the conventional liquid crystal display device, reduce the manufacture cost, and improve the yield rate.

The first glass substrate 22 comprises a bottom surface 222 that is close to the TFT substrate 10 and a top surface 224 that is away from the TFT substrate 10. As shown in FIG. 1, in a liquid crystal display device according to an embodiment of the present invention, the flexible color filter film 26 is provided on the top surface 224 of the first glass substrate 22 and the first polarization plate 24 is disposed on the flexible color filter film 26. In other words, the flexible color filter film 26 is arranged between the first polarization plate 24 and the first glass substrate 22. The flexible color filter film 26 can be directly formed on the top surface 224 of the first glass substrate 22 through stamping, printing, coating development, or polymerization deposition, or can alternatively be attached to the top surface 224 of the first glass substrate 22 by adhesives.

The TFT substrate 10 comprises a second glass substrate 12 and a second polarization plate 14 that is attached to the second glass substrate 12 and distant from the liquid crystal 30.

Figure 2:
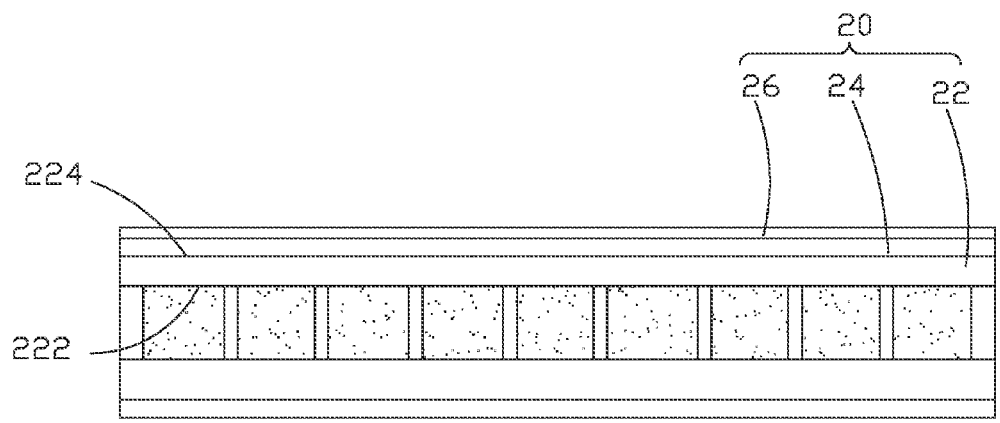
FIG. 2 is a schematic view showing the structure of a liquid crystal display device according to a second embodiment of the present invention.

Referring to FIG. 2, which is a schematic view showing the structure of a liquid crystal display device according to a second embodiment of the present invention, in the instant embodiment, a first polarization plate 24 is directly bonded to a top surface 224 of a first glass substrate 22. A flexible color filter film 26 can be directly formed on a surface of the first polarization plate 24 that is away from the first glass substrate 22 through stamping, printing, coating development, or polymerization deposition, or can be attached to the surface of the first polarization plate 24 that is away from the first glass substrate 22 by adhesives.

Figure 3:
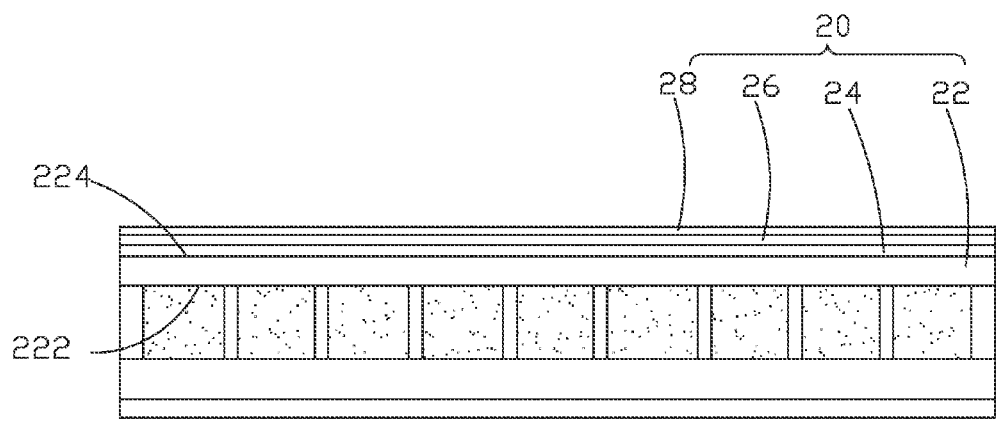
FIG. 3 is a schematic view showing the structure of a liquid crystal display device according to a third embodiment of the present invention.

Referring to FIG. 3, which is a schematic view showing the structure of a liquid crystal display device according to a third embodiment of the present invention, in the instant embodiment, a CF substrate 20 comprises a first polarization plate 24 disposed on a top surface 224 of a first glass substrate 22 of the CF substrate 20 and a compensation film 28 disposed on the first polarization plate 24 and distant from the first glass substrate 22. The compensation film 28 effects optic compensation with respect to the first polarization plate 24. A flexible color filter film 26 is arranged between the first polarization plate 24 and the compensation film 28. The flexible color filter film 26 can be directly formed on a surface of the first polarization plate 24 that is away from the first glass substrate 22 through stamping, printing, coating development, or polymerization deposition, or can alternatively attached to the surface of the first polarization plate 24 that is away from the first glass substrate 22 by adhesives, or can alternatively be directly formed on a surface of the compensation film 28 that is adjacent to the first polarization plate 24 through stamping, printing, coating development, or polymerization deposition, or can alternatively be attached to the surface of the compensation film 28 that is adjacent o the first polarization plate 24 by adhesives.

Figure 4:
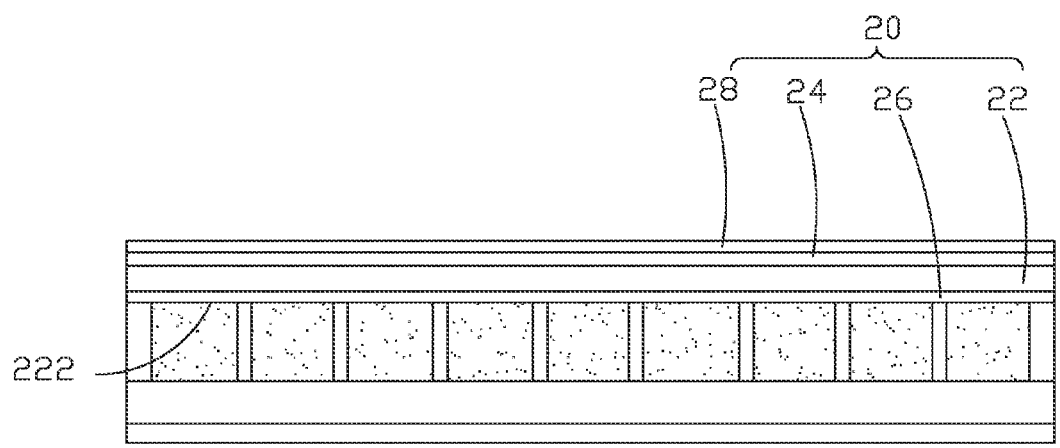
FIG. 4 is a schematic view showing the structure of a liquid crystal display device according to a fourth embodiment of the present invention.

Referring to FIG. 4, which is a schematic view showing the structure of a liquid crystal display device according to a fourth embodiment of the present invention, in the instant embodiment, a flexible color filter film 26 is arranged on a bottom surface 222 of a first glass substrate 22, whereby the flexible color filter film 26 is located between the first glass substrate 22 and the liquid crystal 30. The flexible color filter film 26 can be directly formed on the bottom surface 222 of the first glass substrate 22 through stamping, printing, coating development, or polymerization deposition, or can alternatively be attached to the bottom surface 222 of the first glass substrate 22 by adhesives.

Figure 5:
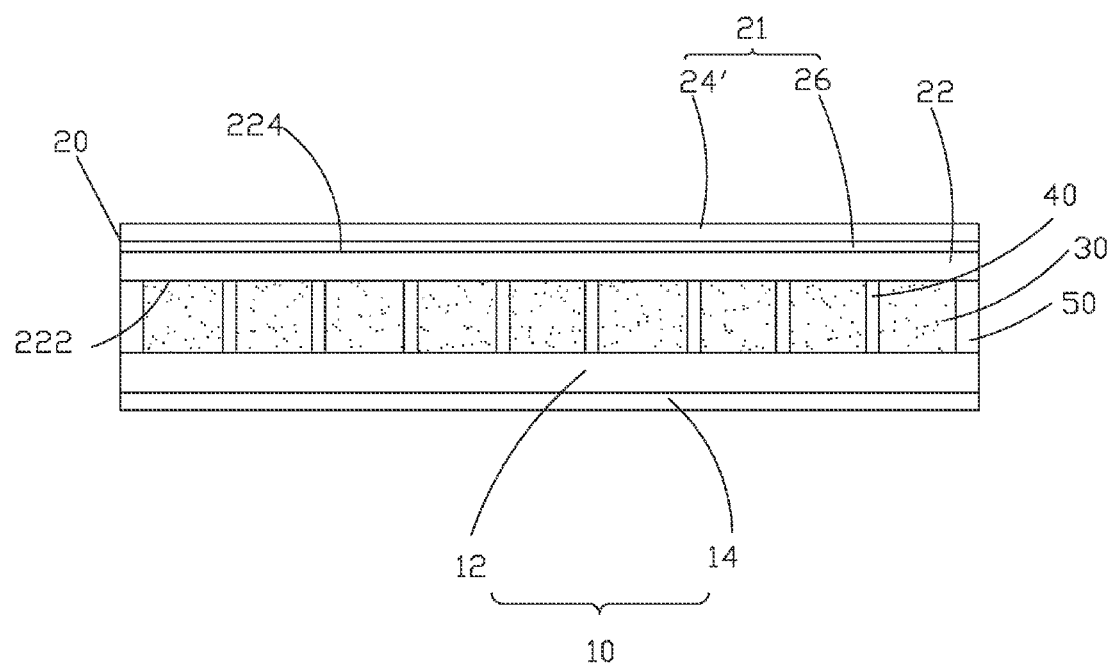
FIG. 5 is a schematic view showing the structure of a liquid crystal display device according to a fifth embodiment of the present invention

Referring to FIG. 5, which is a schematic view showing the structure of a liquid crystal display device according to a fifth embodiment of the present invention, the liquid crystal display device comprises: a TFT substrate 10, a CF substrate 20 that is arranged parallel to the TFT substrate 10, liquid crystal 30 interposed between the TFT substrate 10 and the CF substrate 20, spacers 40 arranged between the TFT substrate 10 and the CF substrate 20, and an enclosing resin frame 50 arranged between the TFT substrate 10 and the CF substrate 20 and located along edges of the TFT substrate 10 and the CF substrate 20.

The CF substrate 20 comprises a first glass substrate 22 and a composite film 21 disposed on the first glass substrate 22. The first glass substrate 22 comprises a bottom surface 222 that is closed to the TFT substrate 10 and a top surface 224 that is away from the TFT substrate 10. The composite film 21 comprises a flexible color filter film 26 and a polarization film 24' arranged on the flexible color filter film. The composite film 21 can be attached to the first glass substrate 22 by adhesives.

The composite film 21 is a flexible film and the flexible color filter film 26 of the composite film can be formed through stamping, printing, coating development, or polymerization deposition and is combined integrally with the polarization film 24' to form the composite film 21 that is composed of the flexible color filter film 26 and the polarization film 24' so as to simplify the manufacture of the CF substrate and improve manufacture yield.

Further, the composite film 21 can be attached to the top surface 224 of the first glass substrate 22 with the flexible color filter film 26 facing the first glass substrate 22 or can alternatively be attached to the top surface 224 of the first glass substrate 22 with the polarization film 24' facing the first glass substrate 22.

The TFT substrate 10 comprises a second glass substrate 12 and a second polarization plate 14 that is attached to the second glass substrate 12 and distant from the liquid crystal 30.

Figure 6:
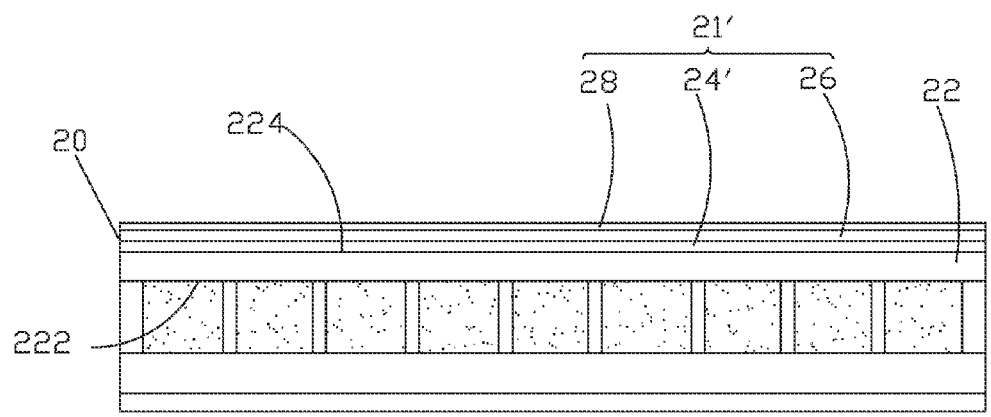
FIG. 6 is a schematic view showing the structure of a liquid crystal display device according to a sixth embodiment of the present invention.

Referring to FIG. 6, which is a schematic view showing the structure of a liquid crystal display device according to a sixth embodiment of the present invention, in the instant embodiment, a composite film 21' comprises a flexible color filter film 26, a polarization film 24', and a compensation film 28. The compensation film 28 is distant from the first glass substrate 22 and disposed above the polarization film 24'. The flexible color filter film 26 is arranged between the polarization film 24' and the compensation film 28. The compensation film 28 effects optic compensation with respect to the polarization film 24'. The compensation film 28 is manufactured together with the polarization film 24' and the flexible color filter film 26 in order to form a composite film 21' having a multiple-layered structure for further simplifying the manufacture of the CF substrate and also simplifying the assembling operation.

Figure 7:
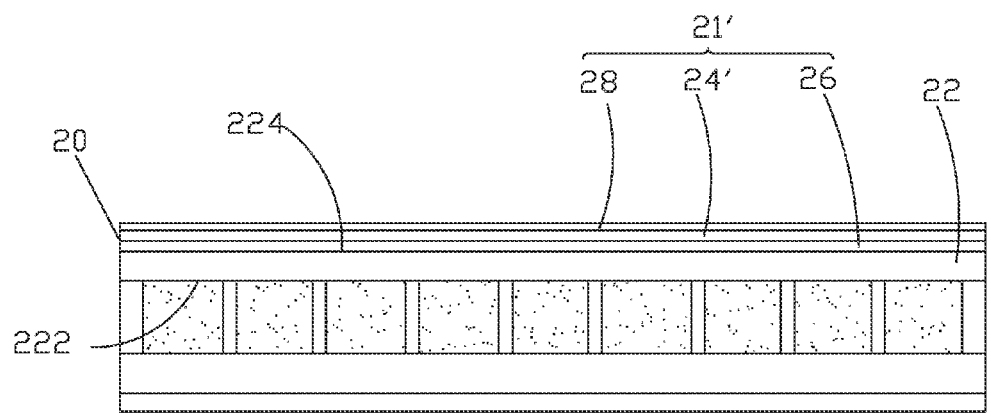
FIG. 7 is a schematic view showing the structure of a liquid crystal display device according to a seventh embodiment of the present invention.

Referring to FIG. 7, which is a schematic view showing the structure of a liquid crystal display device according to a seventh embodiment of the present invention, in the instant embodiment, a composite film 21' has a structure that comprises a flexible color filter film 26 located at a bottom layer that is adjacent to a first glass substrate 22, a compensation film 28 located at a top layer that is away from the first glass substrate 22, and a polarization film 24' located between the flexible color filter film 26 and the compensation film 28. The compensation film 28 is manufactured together with the polarization film 24' and the flexible color filter film 26 in order to form a composite film 21' having a multiple-layered structure for further simplifying the manufacture of the CF substrate 20 and also simplifying the assembling operation.

In summary, the present invention provides a liquid crystal display device, which comprises a flexible color filter film to replace a conventionally used color filter plate and being formed through stamping, printing, coating development, or polymerization deposition so as to simplify the manufacture of the color filter plate and improve manufacture yield to thereby reduce the manufacture cost. Further, the flexible color filter film can be attached to a first glass substrate by adhesives to form a CF substrate, thereby improving the yield rate of assembling and further reducing manufacture cost. Further, the flexible color filter film can be manufactured together with a polarization film and a compensation film to form a composite film having a multiple-layered structure for subsequent application to a liquid crystal display device for simplifying the manufacture process and also simplifying assembling operation.

Based on the description given above, those having ordinary skills of the art may easily contemplate various changes and modifications of the technical solution and technical ideas of the present invention and all these changes and modifications are considered within the protection scope of right for the present invention.

What is claimed is:

1. A liquid crystal display device, comprising: a thin film transistor (TFT) substrate, a color filter (CF) substrate that is arranged parallel to the TFT substrate, liquid crystal interposed between the TFT substrate and the CF substrate, spacers arranged between the TFT substrate and the CF substrate, and an enclosing resin frame arranged between the TFT substrate and the CF substrate and located along edges of the TFT substrate and the CF substrate, the CF substrate comprising a first glass substrate and a flexible color filter film arranged on the first glass substrate, the first glass substrate comprising a bottom surface that is close to the TFT substrate and a top surface that is away from the TFT substrate, the flexible color filter film being of a form of thin film bonded to the first glass substrate;

wherein the CF substrate comprises a first polarization plate located on the top surface of the first glass substrate of the CF substrate and a compensation film that is away from the first glass substrate and located on the first polarization plate, the flexible color filter film being arranged between the compensation film and the first polarization plate.

2. The liquid crystal display device as claimed in claim 1, wherein the flexible color filter film is formed through a process of stamping, printing, coating development, or polymerization deposition and is attached to the first glass substrate by adhesives.

3. The liquid crystal display device as claimed in claim 1, wherein the flexible color filter film is arranged on the top surface of the first glass substrate.

4. The liquid crystal display device as claimed in claim 3, wherein the CF substrate further comprises a first polarization plate, which is arranged above the top surface of the first glass substrate of the CF substrate, the flexible color filter film being arranged above the first polarization plate or between the first polarization plate and the first glass substrate.

5. The liquid crystal display device as claimed in claim 1, wherein the flexible color filter film is arranged on the bottom surface of the first glass substrate.

6. A liquid crystal display device, comprising: a thin film transistor (TFT) substrate, a color filter (CF) substrate that is arranged parallel to the TFT substrate, liquid crystal interposed between the TFT substrate and the CF substrate, spacers arranged between the TFT substrate and the CF substrate, and an enclosing resin frame arranged between the TFT substrate and the CF substrate and located along edges of the TFT substrate and the CF substrate, the CF substrate comprising a first glass substrate and a flexible color filter film arranged on the first glass substrate, the first glass substrate comprising a bottom surface that is close to the TFT substrate and a top surface that is away from the TFT substrate, the flexible color filter film being of a form of thin film bonded to the first glass substrate;

wherein the flexible color filter film is formed through a process of stamping, printing, coating development, or polymerization deposition and is attached to the first glass substrate by adhesives;

wherein the flexible color filter film is arranged on the top surface of the first glass substrate;

wherein the CF substrate further comprises a first polarization plate, which is arranged above the top surface of the first glass substrate of the CF substrate, the flexible color filter film being arranged above the first polarization plate or between the first polarization plate and the first glass substrate; and wherein the CF substrate comprises a first polarization plate located on the top surface of the first glass substrate of the CF substrate and a compensation film that is away from the first glass substrate and located on the first polarization plate, the flexible color filter film being arranged between the compensation film and the first polarization plate.

7. A liquid crystal display device, comprising: a thin film transistor (TFT) substrate, a color filter (CF) substrate that is arranged parallel to the TFT substrate, liquid crystal interposed between the TFT substrate and the CF substrate, spacers arranged between the TFT substrate and the CF substrate, and an enclosing resin frame arranged between the TFT substrate and the CF substrate and located along edges of the TFT substrate and the CF substrate, the CF substrate comprising a first glass substrate and a composite film arranged on the first glass substrate, the composite film comprising a flexible color filter film and a polarization film arranged on the flexible color filter films;

wherein the composite film further comprises a compensation film, which is distant from the first glass substrate and located on the polarization film.

8. The liquid crystal display device as claimed in claim 7, wherein the first glass substrate comprises a bottom surface that is close to the TFT substrate and a top surface that is away from the TFT substrate, the flexible color filter film being formed through a process of stamping, printing, coating development, or polymerization deposition and being attached to the top surface of the first glass substrate by adhesives.

9. The liquid crystal display device as claimed in claim 7, wherein the flexible color filter film is arranged below the polarization film or between the polarization film and the compensation film.

\* \* \* \* \*